United States Patent
Yuan et al.

(10) Patent No.: US 11,675,190 B2
(45) Date of Patent: Jun. 13, 2023

(54) HEAD UP DISPLAY COMBINED WITH HOLOGRAPHIC ELEMENT FOR DRIVER MONITORING

(71) Applicant: Panasonic Automotive Systems Company of America, Division of Panasonic Corporation of North America, Peachtree City, GA (US)

(72) Inventors: Liang Yuan, Peachtree City, GA (US); John Avery, Newnan, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 263 days.

(21) Appl. No.: 16/920,596

(22) Filed: Jul. 3, 2020

(65) Prior Publication Data

US 2021/0026137 A1    Jan. 28, 2021

Related U.S. Application Data

(60) Provisional application No. 62/846,067, filed on May 10, 2019.

(51) Int. Cl.
*G02B 27/01* (2006.01)
*B60K 37/02* (2006.01)

(52) U.S. Cl.
CPC .......... *G02B 27/0103* (2013.01); *B60K 37/02* (2013.01); *G02B 2027/0183* (2013.01)

(58) Field of Classification Search
CPC ................ G02B 27/01; G02B 27/0103; G02B 2027/0105; G02B 2027/0107; G02B 2027/0109; G02B 2027/0183; G02B 2027/0181; B60K 37/02; B60K 35/00; B60K 2370/1529; B60K 2370/23; B60K 2370/29; B60K 2370/31; B60K 2370/349; B60K 2370/736; B60K 2370/741
See application file for complete search history.

(56) References Cited

U.S. PATENT DOCUMENTS

| | | | |
|---|---|---|---|
| 2007/0109619 A1* | 5/2007 | Eberl | G06F 3/013 359/17 |
| 2018/0149874 A1* | 5/2018 | Aleem | G02B 27/0093 |
| 2019/0121130 A1* | 4/2019 | Nguyen | G02B 27/0103 |

* cited by examiner

*Primary Examiner* — Vijay Shankar
*Assistant Examiner* — Cory A Almeida
(74) *Attorney, Agent, or Firm* — Laurence S. Roach

(57) ABSTRACT

A head up display arrangement for a motor vehicle includes a picture generation unit producing a light field. An optical element reflects the light field such that the light field is visible to a human driver of the motor vehicle as a virtual image. A holographic film is attached to the optical element. A driver monitoring system senses infrared energy reflected by the holographic film.

13 Claims, 4 Drawing Sheets

HEAD UP DISPLAY COMBINED WITH HOLOGRAPHIC ELEMENT FOR DRIVER MONITORING

CROSS-REFERENCED TO RELATED APPLICATIONS

This application claims benefit of U.S. Provisional Application No. 62/846,067 filed on May 10, 2019, the disclosure of which is hereby incorporated by reference in its entirety for all purposes.

FIELD OF THE INVENTION

The disclosure relates to a head up display (HUD) system in a motor vehicle.

BACKGROUND OF THE INVENTION

A head up display emits light that reflects off of one or more mirrors and from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Conventional HUDs create the virtual image by first using a display to create an image. Next, the light from the image is reflected from one or more mirrors, in which the light is lastly reflected from the combiner mirror in a combiner HUD or from the windshield (WS) in a WS HUD prior to being redirected into the driver's eyes, such that the driver can see a virtual image that appears to come from a distance behind that last partial-reflection mirror (or the WS) and that also appears to be located outside of the vehicle. The whole HUD unit with display and all mirrors are typically placed at the top of the dashboard within a vehicle.

SUMMARY

The present invention may provide novel optical functions using a holographic optical element (HOE), especially in the form of thin film, to go beyond traditional (e.g., mirror-like) specular reflection functions. This invention may provide a driver monitoring system (DMS) for a head-up display (HUD), and enhance infrared (IR)-spectrum performance as compared to the performance of traditional optics of the same shape within the context of a HUD system used in automotive industries. To this end, this invention may use a flexible thin film HOE which may be free-standing, deposited on an optical surface (e.g., front or back), or sandwiched by two optically-clear mating parts. The flexible thin film HOE may be placed within the optical pathway to selectively interact with (e.g., reflect or diffract) infrared light, but may be largely transparent for visible light, or may not significantly interact with visible light. This invention has no significantly detrimental impact on the driver's perception of the visible HUD virtual image.

The result of using a dual-function combiner is a system that projects visible light to be seen as a virtual image by the driver as in a conventional combiner HUD, and a driver monitoring system that is able to see a larger-than-eye-box area of the driver's face, or even to cover the entire face.

In one embodiment, the invention comprises a head up display arrangement for a motor vehicle. The arrangement includes a picture generation unit (PGU) producing a light field. An optical element reflects the light field such that the light field is visible to a human driver of the motor vehicle as a virtual image. A holographic film is attached to the optical element. A driver monitoring system senses infrared energy reflected by the holographic film.

In another embodiment, the invention comprises a head up display method for a motor vehicle, including using a PGU to produce a light field. The light field is reflected by use of an optical element such that the light field is visible to a human driver of the motor vehicle as a virtual image. A holographic film is attached to the optical element. Infrared energy originating from a human driver of the motor vehicle and reflected by the holographic film is sensed.

In yet another embodiment, the invention comprises a head up display arrangement for a motor vehicle, including a PGU producing a light field. An optical element reflects the light field such that the light field is visible to a human driver of the motor vehicle as a virtual image. A holographic film passes the light field therethrough and reflects infrared energy originating from the human driver. A driver monitoring system senses the infrared energy after the infrared energy has been reflected by the holographic film.

In a further embodiment, the invention comprises a head up display arrangement for a motor vehicle, including a holographic film reflecting infrared energy originating from a human driver of the motor vehicle. A driver monitoring system senses the infrared energy after the infrared energy has been reflected by the holographic film. A picture generation unit produces a light field. An optical element passes the infrared energy therethrough and reflects the light field such that the light field is visible to the human driver as a virtual image.

An advantage of the present invention is that it may provide light reflection from the hologram film surface that breaks the traditional mirror reflection law of having symmetric incident and reflective angles with respect to the surface normal direction (e.g., the same angle, but forming from the opposite side).

Another advantage is that an enhanced field of view (FOV) of the driver monitoring system (DMS) may be enabled using otherwise identical optical elements of a DMS HUD, and with no significant impact on the HUD image.

Yet another advantage is that this invention enables dual functions of an existing optic that is made for one single function, by conformably applying a peel-able thin film of hologram having a second function to at least one optical surface. The dual-function may be for two different spectra. For one example, the optic may have a first function in the visible spectrum and the hologram may add a second independent function in the infrared spectrum.

A further advantage is that this invention makes it possible for a HUD to perform an infrared (IR) function, with no need to have a low-E coating on the wind shield (WS) that would impose a significant change in the present WS mass production process, and with no need to polish/cut/top existing bulky optics to generate at least one new optical surface for satisfactory IR function.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
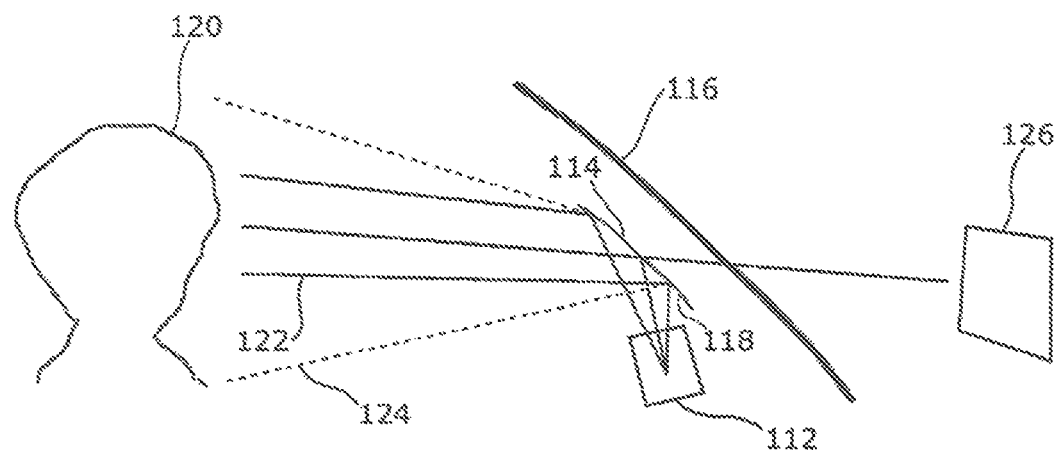
FIG. 1 is a schematic diagram of one embodiment of a HUD arrangement of the present invention.

FIG. 1 illustrates one embodiment of a HUD arrangement of the present invention including a combiner HUD with a HOE film on the combiner surface to enhance the field of view (FOV) of the DMS. The HUD arrangement includes a combiner HUD with a picture generation unit (PGU) 112, other optics for light field delivery, and a combiner mirror 114, which as a whole is typically placed underneath the vehicle windshield 116. An HOE (or hologram) film 118 may be applied on the surface of the combiner mirror 114 and may enable enhanced detection coverage of the driver 120 in a DMS within PGU 112. In particular, the reflected visible light (one ray is denoted as the line 122) from the windshield 114 and the reflected IR light (one ray is denoted as the line 124) from the hologram 118 may have different reflection angles. The reflected visible light determines how the driver 120 perceives the virtual image 126 that is projected from the PGU 112. The reflected IR light determines the detection coverage of the DMS. Hologram film 118, which may be made in a particular way out of careful design, may interact only with IR light and cause no impact in visible light and thus may alter the reflection angle of the IR light (and in this case enlarge the reflection angle range) to provide enhanced DMS performance.

Figure 2:
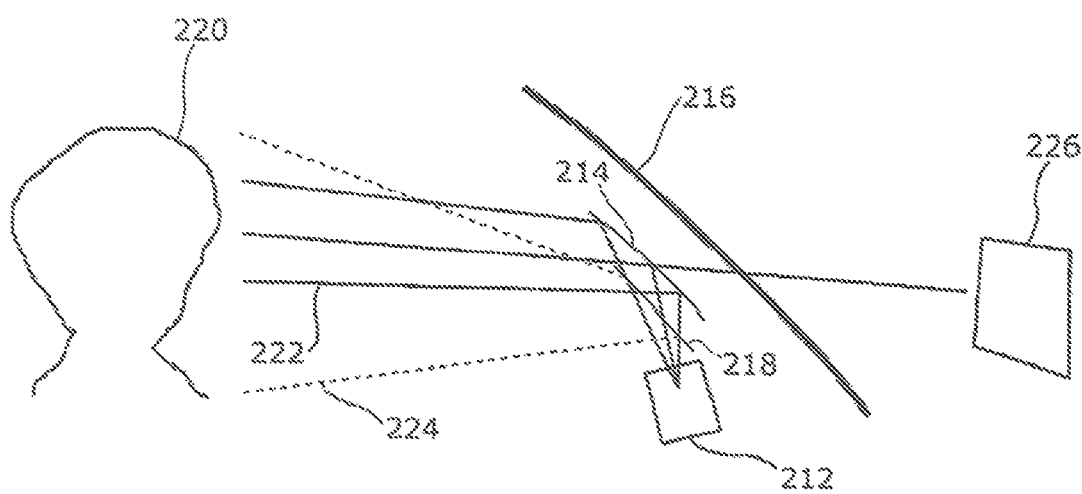
FIG. 2 is a schematic diagram of another embodiment of a HUD arrangement of the present invention.

FIG. 2 illustrates another embodiment of a HUD arrangement of the present invention including a combiner HUD with a HOE film in front of the combiner surface to enhance the FOV of the DMS. The HUD arrangement includes a similar combiner HUD with a PGU 212, other optics for light field delivery, and a combiner mirror 214, which as a whole may be placed next to the vehicle windshield 216. A free-standing HOE (or hologram) film 218, which may be held, retained or sandwiched by supporting and/or protective parts, may enable enhanced detection coverage of the driver 220 of the DMS within PGU 212. The driver 220 may perceive visible light reflected from the combiner mirror 214 (one ray is denoted as the solid line 222). Driver 220 may be exposed to IR light reflected from the hologram film 218, which may have an enlarged zone coverage as compared to the visible light eye box that appears to come from the virtual image 226.

Figure 3:
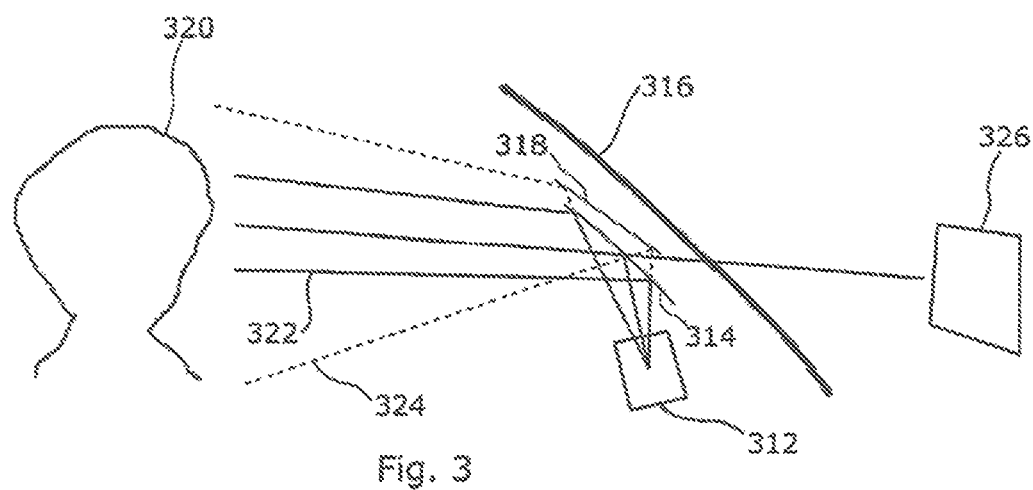
FIG. 3 is a schematic diagram of yet another embodiment of a HUD arrangement of the present invention.

FIG. 3 illustrates yet another embodiment of a HUD arrangement of the present invention including a combiner HUD with a HOE film behind the combiner surface to enhance the FOV of the DMS. The HUD arrangement includes a similar combiner HUD with PGU 312 (having a DMS), other optics for optical field delivery, and a combiner mirror 314. In this embodiment too, the HUD arrangement is typically placed underneath the windshield 316. A free-standing HOE (or hologram) film 318 may be held, retained or sandwiched by supporting and/or protective parts, and may be disposed between the combiner mirror 314 and the windshield 316. In an alternative embodiment, the hologram film 318 may be directly applied on the inside surface of the windshield 316. The structure of the hologram film 318 may be different for these two different embodiments. The driver 320 may see the visible light 322 and be exposed to, or emit, IR light 324, which may not affect the way the virtual image 326 is perceived by the driver 320.

Figure 4:
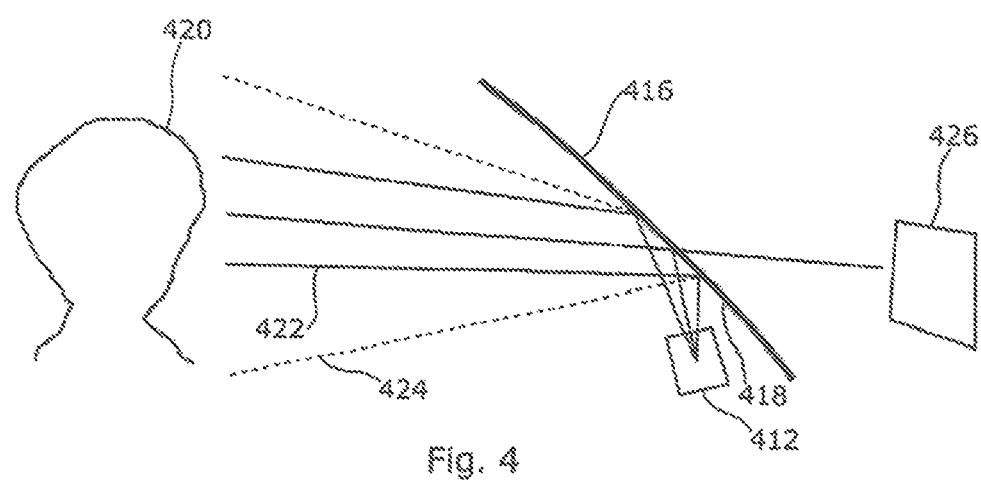
FIG. 4 is a schematic diagram of still another embodiment of a HUD arrangement of the present invention.

FIG. 4 illustrates yet another embodiment of a HUD arrangement of the present invention including a HOE film on the windshield surface to enhance the FOV of the DMS. The HUD arrangement includes a windshield HUD with PGU 412 (having a DMS) and other optics that deliver the image to be reflected by the windshield 416 and a HOE (or hologram) film 418 applied to the inside surface of the windshield 416. By having this hologram, the invention enables IR light to illuminate the driver 420 in a way that is more divergent than the visible counterpart (as shown by the difference between the visible light denoted as the solid line 422 and the IR light denoted as the dashed line 424). The virtual image 426 may not be affected by the insertion of the hologram film 418.

Figure 5:
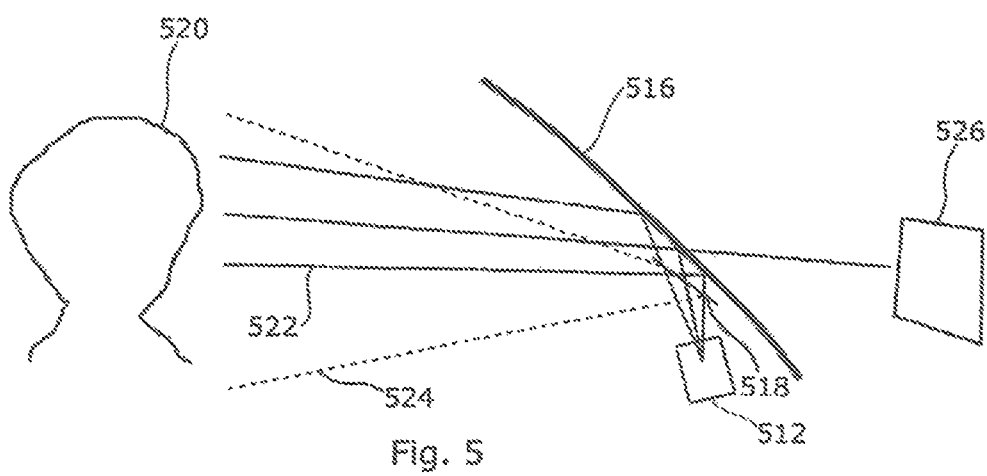
FIG. 5 is a schematic diagram of a further embodiment of a HUD arrangement of the present invention.

FIG. 5 illustrates still another embodiment of a HUD arrangement of the present invention including a HOE film in front of the windshield surface to enhance the FOV of the DMS. The HUD arrangement includes a windshield HUD with PGU 512 (having a DMS) and other optics that deliver the image to be reflected by the windshield 516 and a HOE (or hologram) film 518. A free-standing HOE (or hologram) film 518 may be held, retained or sandwiched by supporting and/or protective parts to enable enhanced detection coverage of the driver 520 by the DMS. The driver 520 may perceive visible light rays, one of which is denoted as the solid line 522, and may be exposed to IR light rays, one of which is denoted as the dashed line 524. The IR function is separate from the visible light functions and from virtual image 526.

Figure 6:
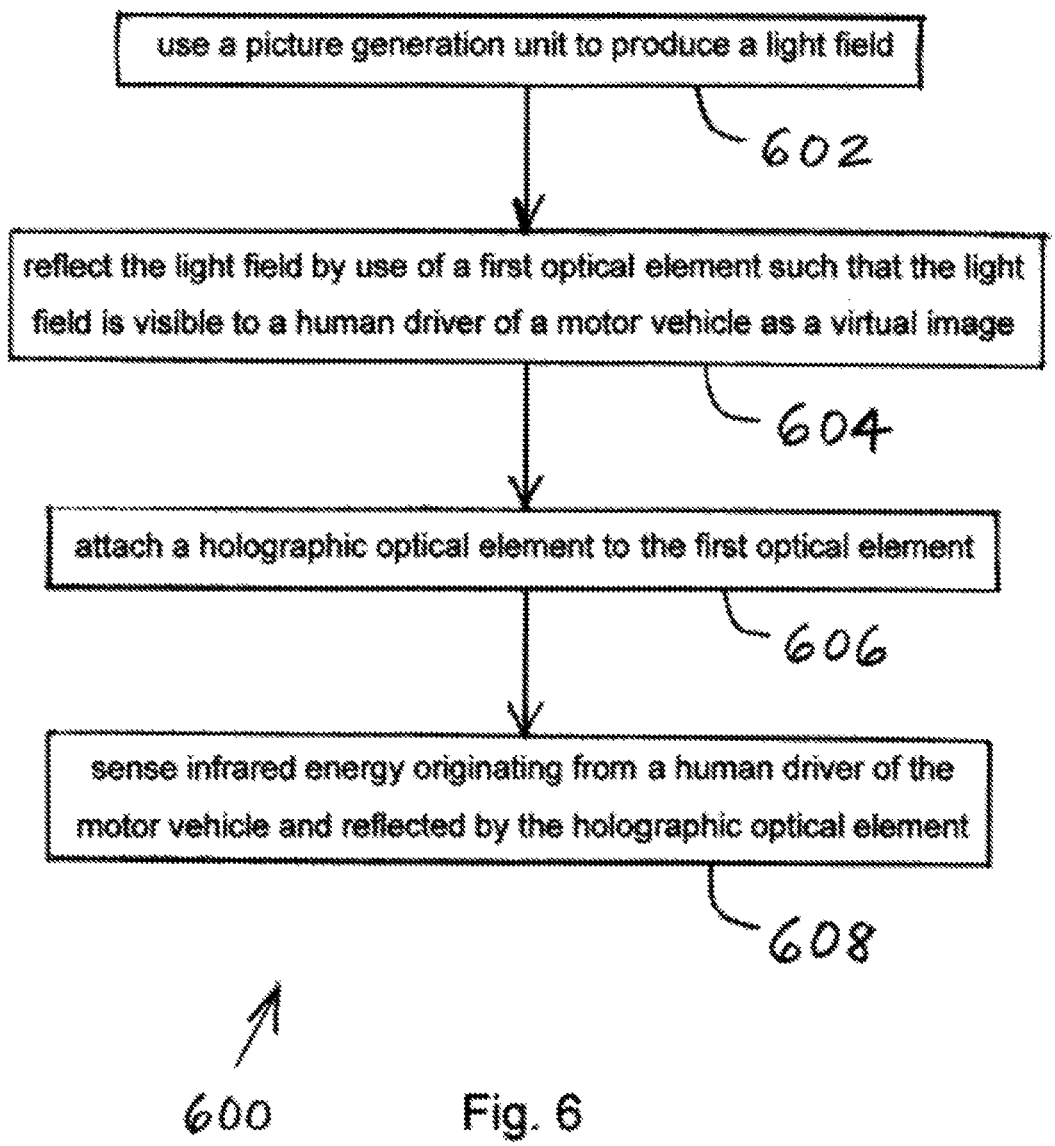
FIG. 6 is a flow chart of one embodiment of a HUD method of the present invention for a motor vehicle.

FIG. 6 illustrates one embodiment of a HUD method 600 of the present invention for a motor vehicle. In a first step 602, a picture generation unit is used to produce a light field. For example, picture generation unit (PGU) 112 may produce a light field.

In a next step 604, the light field is reflected by use of a first optical element such that the light field is visible to a human driver of the motor vehicle as a virtual image. For example, combiner mirror 114 may reflect the light field such that the light field, as indicated at 122, is visible to human driver 120 of the motor vehicle as virtual image 126.

Next, in step 606, a holographic optical element is attached to the first optical element. For example, HOE (or hologram) film 118 may be applied on the surface of combiner mirror 114.

In a final step 608, infrared energy originating from a human driver of the motor vehicle and reflected by the holographic optical element is sensed. For example, infrared energy originating from human driver 120 and reflected by HOE film 118 may be sensed by a DMS electronic processor within PGU 112.

The foregoing description may refer to "motor vehicle", "automobile", "automotive", or similar expressions. It is to be understood that these terms are not intended to limit the invention to any particular type of transportation vehicle.

Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, the arrangement comprising:
    a holographic optical element positioned and configured to reflect infrared energy originating from a human driver of the motor vehicle;
    a driver monitoring system configured to sense the infrared energy originating from the human driver after the infrared energy originating from the human driver has been reflected by the holographic optical element;
    a picture generation unit configured to produce a light field; and
    a second optical element positioned and configured to pass the infrared energy therethrough and to reflect the light field such that the light field is visible to the human driver as a virtual image.

2. The head up display arrangement of claim 1 wherein the second optical element comprises a combiner mirror.

3. The head up display arrangement of claim 1 wherein the second optical element comprises a windshield.

4. The head up display arrangement of claim 1 wherein the holographic optical element provides a range of reflection angles for the infrared energy that is larger than a range of reflection angles provided by the second optical element for the light field.

5. The head up display arrangement of claim 1 wherein the holographic optical element comprises a holographic film.

6. The head up display arrangement of claim 1 wherein the holographic optical element provides nonsymmetric incident and reflective angles with respect to a surface normal direction.

7. A head up display arrangement for a motor vehicle, the arrangement comprising:
    a picture generation unit configured to produce a light field;
    a first optical element positioned and configured to reflect the light field such that the light field is visible to a human driver of the motor vehicle as a virtual image;
    a holographic optical element positioned and configured to pass the light field therethrough and reflect infrared energy originating from the human driver; and
    a driver monitoring system configured to sense the infrared energy originating from the human driver after the infrared energy originating from the human driver has been reflected by the holographic optical element.

8. The head up display arrangement of claim 7 wherein the first optical element comprises a combiner mirror.

9. The head up display arrangement of claim 7 wherein the first optical element comprises a windshield.

10. The head up display arrangement of claim 7 wherein the holographic optical element provides a range of reflection angles for the infrared energy that is larger than a range of reflection angles provided by the first optical element for the light field.

11. The head up display arrangement of claim 7 wherein the holographic optical element comprises a holographic film.

12. The head up display arrangement of claim 7 wherein the holographic optical element comprises a flexible thin film.

13. The head up display arrangement of claim 7 wherein the holographic optical element provides nonsymmetric incident and reflective angles with respect to a surface normal direction.

* * * * *